Figure 1:
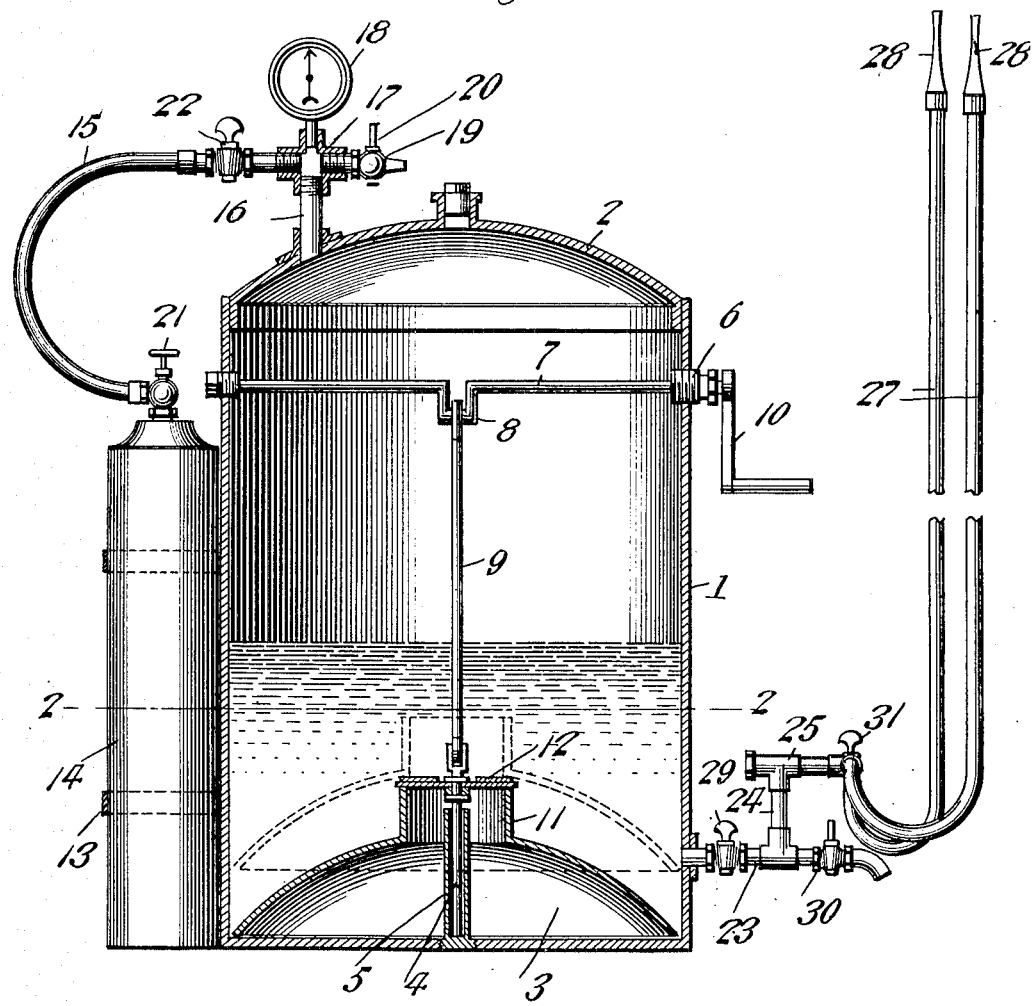

No. 851,758. PATENTED APR. 30, 1907.
E. F. KAUFFMAN.
SPRAYING DEVICE.
APPLICATION FILED FEB. 24, 1906.
2 SHEETS—SHEET 2.
Fig. 2.
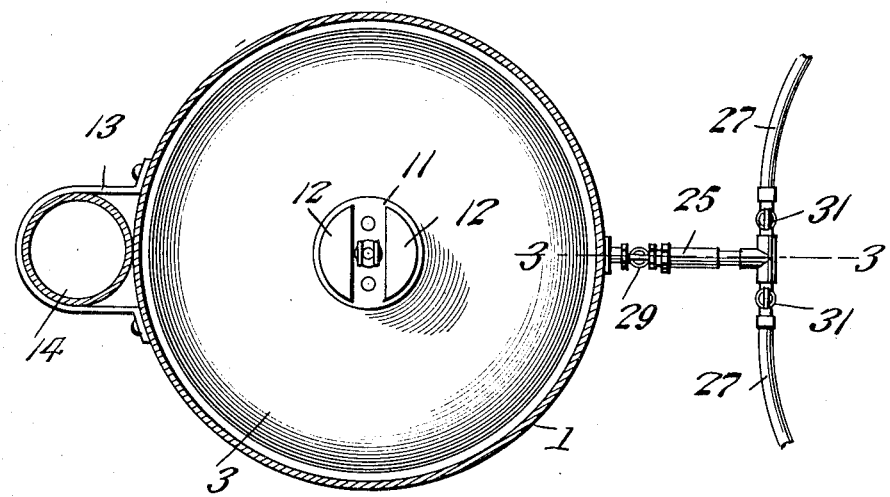
Fig. 3.
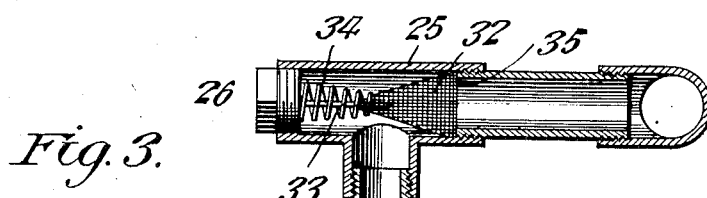
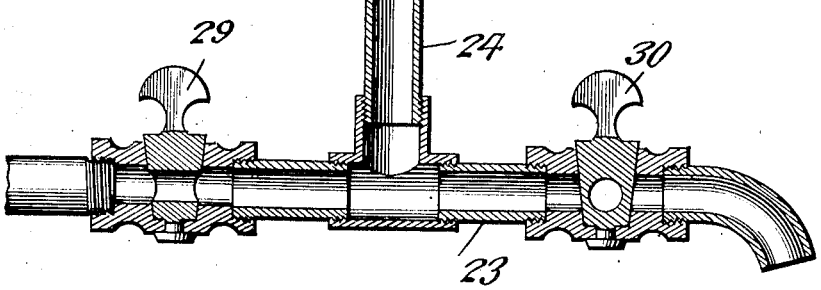
WITNESSES:
INVENTOR
E. F. Kauffman
BY
Victor J. Evans
Attorney

UNITED STATES PATENT OFFICE.

ELI F. KAUFFMAN, OF YORK, PENNSYLVANIA.

SPRAYING DEVICE.

No. 851,758.  Specification of Letters Patent.  Patented April 30, 1907.

Application filed February 24, 1906. Serial No. 302,699.

*To all whom it may concern:*

Be it known that I, ELI F. KAUFFMAN, a citizen of the United States, residing at York, in the county of York and State of Pennsylvania, have invented new and useful Improvements in Spraying Devices, of which the following is a specification.

This invention relates to spraying devices or atomizers designed especially for use in spraying trees, plants or the like, with liquid to destroy insects, and embodies in its organization a tank or reservoir adapted to receive the liquid to be sprayed and containing an agitating device, said tank, which is equipped with suitable spraying nozzles, being connected for communication with a gas cylinder for supplying gas to the liquid contents of the tank.

The invention has for its objects to provide a comparatively simple, inexpensive device of this character in which the agitator may be conveniently manipulated for stirring the contents of the tank when desired, one in which the agitator will in a large measure prevent the accumulation of sediment upon the bottom of the tank and its passage to the spraying devices, one wherein the liquid will in its passage from the tank to the nozzles be strained or filtered, and one in which the strainer may be quickly removed during operation of the device.

With these and other objects in view, the invention comprises the novel features of construction and combination of parts more fully hereinafter described.

In the accompanying drawings: Figure 1 is a sectional elevation of a spraying device embodying the invention, the section being taken centrally and vertically through the tank. Fig. 2 is a horizontal section taken on the line 2—2 of Fig. 1. Fig. 3 is an enlarged detail sectional view taken on the line 3—3 of Fig. 2.

Referring to the drawings, 1 designates a vessel or tank provided with a removable cover 2 and containing a vertically movable dome-shaped agitator 3 carried by a guide rod 4 adapted for reciprocation in a vertical, tubular guide 5 fixed to and arising from the bottom of the tank, in the upper portion of which there is journaled in suitable bearings 6 a transversely extending rotary crank shaft 7 having a crank portion or bend 8 connected with the agitator by means of a pitman rod 9 and equipped at its outer end with an operating handle 10, the agitator being provided at its top with an uprising tubular throat 11 normally closed by a pair of coöperating flap valves 12 composed of leather or other appropriate flexible material and suitably connected to the guide rod 4.

Attached to the tank 1 at its rear side by means of straps or bands 13 is a metal cylinder 14 containing carbonic acid gas, there being coupled to the upper end of the cylinder a flexible tube or duct 15, in turn coupled to a short pipe section 16 entered through the cover 2 by means of a fourway coupling member 17, to which are connected a pressure gage 18 and a relief or blow-off nozzle 19 controlled by a valve 20, while mounted at the upper end of the cylinder 14 for controlling communication with the pipe 15 is a cut-off valve 21, a second and similar valve 22 being provided in the duct 15 near its point of connection with the coupling member 17.

Tapped into the wall of the tank 1 at a point adjacent its bottom is a discharge pipe 23 provided between its ends with a vertically uprising portion or section 24 in turn carrying at its upper end a horizontal portion or section closed at its rear end by a screw plug 26 and having connected to its forward end a pair of flexible discharge pipes 27 equipped at their outer ends with spraying nozzles 28, there being in the pipe 23 respectively at opposite sides of its point of communication with the section 24 a pair of cut-off valves 29, 30, similar valves 31 being arranged at the inner ends of the flexible pipes 27.

In practice, the tank 1 having been charged with liquid to be sprayed upon the plants to destroy the insects, the valves 21 and 22 are opened for admitting carbonic acid gas from the cylinder 14 to the tank 1 to force the liquid from the latter outward through the discharge pipes from which it will be delivered through the nozzles 28 in the form of a spray. During the operation of the device the shaft 7 is rotated from time to time, as required, by means of the handle 10 and serves through the pitman 9 to reciprocate the agitator 3 vertically in the tank and through the liquid, the agitator being guided in such movements owing to the movement of rod 4 in the tubular guide member 5. On the downstroke of the agitator the valves 12 open automatically to permit the liquid to pass upward through the tubular neck 11, while upon the upstroke the valves remain closed, it being apparent that the device will act to thoroughly agitate the contents of the tank and prevent accumulation of sediment in the bottom thereof.

Disposed in the upper horizontal section 25 of the discharge pipe is a conical shield or strainer 32 composed of wire gauze or other appropriate reticulated material, said shield being arranged with its pointed end rearward and engaged for support by a pin 33 carried by the plug 26, while coiled upon said pin is a pressure spring 34 arranged to bear upon the rear pointed end of the shield and press the forward end of the same into secure engagement with a marginal shoulder or abutment 35 provided in the section 25. The liquid when forced from the tank through the discharge pipe is filtered through the screen 32 in its passage to the flexible discharge pipes 27, the shield serving to prevent the entrance of any foreign matter or sediment to the spraying pipes and thus obviate clogging of the nozzles 28. It will be observed that when necessary for purposes of cleaning, the shield may be conveniently removed by removing the plug 26.

Having thus described my invention, what I claim is:

1. In a spraying device, a tank, a dome-shaped agitator mounted for vertical reciprocation therein and having an uprising, tubular throat, a pair of coöperating flap valves arranged for closing said throat during upward movement of the agitator, means for moving the latter, and a spraying tube connected with the tank and having a spraying nozzle.

2. In a spraying device, a tank, a discharge pipe connected therewith and having a spraying nozzle, said discharge pipe including a tubular section provided with an internal abutment, a conical reticulated shield arranged in said section to bear at its enlarged end upon said abutment, a plug removably fitted in the end of the section for permitting removal of the shield, a supporting pin carried by the plug and engaged with the rear pointed end of the shield, and a spring coiled upon said pin and acting against the pointed end of the shield for maintaining the other end thereof in contact with the abutment.

In testimony whereof, I affix my signature in presence of two witnesses.

ELI F. KAUFFMAN.

Witnesses:
  MICHAEL SMYSER,
  H. B. AUSTINE,
  JAS. J. LOGAN.